United States Patent
Hull

(10) Patent No.: US 9,344,778 B2
(45) Date of Patent: May 17, 2016

(54) WIRELESS MAGNETIC MUTUAL INDUCTION COMMUNICATION SYSTEM FOR THE CONE PENETROMETER INDUSTRY

(71) Applicant: Rocky Lane Hull, Royalton, VT (US)

(72) Inventor: Rocky Lane Hull, Royalton, VT (US)

(73) Assignee: Rocky Lane Hull, Royalton, VT (US)

( * ) Notice: Subject to any disclaimer, the term of this patent is extended or adjusted under 35 U.S.C. 154(b) by 321 days.

(21) Appl. No.: 14/214,568

(22) Filed: Mar. 14, 2014

(65) Prior Publication Data
US 2015/0264453 A1    Sep. 17, 2015

(51) Int. Cl.
| E21B 47/12 | (2012.01) |
| H04Q 9/14 | (2006.01) |
| H04B 1/38 | (2015.01) |
| H04B 5/00 | (2006.01) |

(52) U.S. Cl.
CPC .. *H04Q 9/14* (2013.01); *H04B 1/38* (2013.01); *H04B 5/0031* (2013.01); *H04B 5/0075* (2013.01)

(58) Field of Classification Search
CPC ........................................ E21B 47/12
USPC ................. 340/854.4, 854.5, 854.8
See application file for complete search history.

(56) References Cited

U.S. PATENT DOCUMENTS

| 2,354,887 | A | * | 8/1944 | Silverman | E21B 47/122 175/50 |
| 3,660,760 | A | * | 5/1972 | Schaad | H04B 13/02 343/719 |
| 4,057,781 | A | * | 11/1977 | Scherbatskoy | E21B 47/122 340/854.4 |
| 4,578,675 | A | * | 3/1986 | MacLeod | E21B 17/003 166/66 |
| 5,385,476 | A | * | 1/1995 | Jasper | H01R 13/6633 336/90 |
| 5,615,229 | A | * | 3/1997 | Sharma | H04B 5/0006 375/259 |
| 5,811,972 | A | * | 9/1998 | Thompson | G01V 3/30 324/338 |
| 6,219,529 | B1 | * | 4/2001 | Kimura | H04B 7/24 455/107 |
| 6,459,882 | B1 | * | 10/2002 | Palermo | H02J 7/025 455/101 |

\* cited by examiner

*Primary Examiner* — Albert Wong

(57) ABSTRACT

The Cone Penetrometer Technology (CPT) has evolved over the last several decades as a low cost technique for performing subsurface evaluation for environmental and structural interest. The basic CPT system consist of the push system, cone module, pushrods, tether cable and the data acquisition system. The tether cable is the communication and power interface between the cone and the acquisition system. The Wireless Magnetic Mutual Induction system will replace the need for the tether cable by implementing a battery pack and a wireless communication scheme by using the pushrods, specially made solenoids, and by applying the principle of mutual induction and Faraday's Law.

4 Claims, 4 Drawing Sheets

Standard 1.75 Inch by 39.37 Inch Pushrod
1 Meter

Not to scale

WIRELESS MAGNETIC MUTUAL INDUCTION COMMUNICATION SYSTEM FOR THE CONE PENETROMETER INDUSTRY

CROSS-REFERENCE TO RELATED APPLICATIONS

Not Applicable

STATEMENT REGARDING FEDERALLY SPONSORED RESEARCH OR DEVELOPMENT

This invention was not sponsored or supported by any government funding.

REFERENCE TO SEQUENCE LISTING, A TABLE, OR A COMPUTER PROGRAM LISTING COMPACT DISK APPENDIX

Not Applicable

BACKGROUND OF THE INVENTION

The Cone Penetrometer Technology (CPT) has evolved over the last several decades as a low cost technique for performing subsurface evaluation for environmental and structural interest. The first CPT systems were completely analog and the tether cable was used to bring the sensors output signals to the surface along with providing power to the cone. The up hole acquisition system digitized the sensors output and recorded the data to a computer. Today, almost all the CPT systems have digital cones where all the sensors' signals are processed down hole and only the digital data is transmitted to the up hole acquisition module and computer.

A CPT test is performed by pushing the cone into the ground at a standard rate of two centimeters per second while collecting data every two centimeters. The pushrods are used to advance the cone into the ground by connecting to the back of the cone, one at a time. The pushrods are fabricated to thread together with each having a male and female end. The rods are one meter in length and come in many diameters. The two most common diameters are 1.44 inch and 1.75 inch. See FIG. 1 for more detail.

Most CPT systems only require a four conductor tether cable for doing basic acquisition. The four conductors are defined as Power (Vex+), Common/Ground (Vex−), Transmit (TX) and Receive (RX) if using a communication protocol like RS232. If using a half-duplex bi-directional communication scheme like RS485, the conductors are assigned as Power (Vex+), common/ground (Vex−), Data High (DH) and Data Low (DL). The pushrods need to be threaded over the tether cable much like necklace beads on a string. During a normal CPT test, the pushrods must be slid along the cable until all the excess cable has been removed between the top end of the rod being pushed and bottom end of the next rod which can then be threaded onto the back of the rod that is being pushed.

Once the push system has advanced the cone and pushrods one meter into the ground, the push system needs to stop, unclamp and re-track back up one meter and re-clamp onto the top end of the newly threaded on pushrod. This repetitive process is performed as many time as required to reach the target depth. In order to speed up the process as much as possible a rod person will be positioning the next pushrod and threading it onto the previous pushrod while it is being pushed. The tether cable being linked through each pushrod creates a lot of work for the rod person. When the target depth has been reached the whole process must be reversed. The cable running through the rods makes the probability of automating the pushrod loading/un-loading operation all but impossible, if not cost prohibitive. See FIG. 2 for more detail.

CPT target depths are usually less than one hundred feet but have reached almost three hundred feet in the right ground conditions. Most CPT systems will be setup with a twenty-five or fifty meter tether cable. The tether cables must be designed to ensure a water tight connection to the cone. It is very common to push a cone well below the water table and water will leak in through each of the pushrod joints. It has been determined by field use that it is not practical or reliable to place water tight seals at every rod joint.

The advancement to digital cones has now made the possibility of developing a wireless CPT system probable. At present there are two techniques that are having limited success. The first uses an acoustic telemetry to communicate between the cone and an up-hole module. The second uses a radio frequency (RF) telemetry technique which sends a RF signal up through the center of the pushrods. Each system uses a battery pack to power the cone module.

BRIEF SUMMARY OF INVENTION

The Wireless Magnetic Mutual Induction Communication System has four main components. The up-hole solenoid module, the down-hole solenoid module, the pushrods and the battery pack. The up-hole module consists of a solenoid that slides over the outside of the pushrods with an integrated printed circuit board (PCB). The up-hole module has an interface connector which can connect to power and the computer by using either a wireless Blue Tooth/Wi-Fi transceiver or a cable. The down-hole module consists of a solenoid that is embedded inside a modified pushrod along with an integrated PCB. The down-hole module and cone module are both powered with a battery pack that is also located in the modified pushrod. Both the up-hole and down-hole modules are designed to be transceiver modules. The telemetry technique is accomplished by using the principles of Faraday's Law. See FIG. 3 for more details.

Faraday's Law: The voltage induced in an electric circuit is proportional to the time rate of change of the flux lines of magnetic induction linked with the circuit and the magnitude of the induced voltage is directly proportional to the rate of change of the current.

Magnetic mutual induction telemetry is accomplished by applying a time varying current to one solenoid while the other solenoid is in a listen mode. The pushrod string becomes the flux linkage path between the two solenoids. As long as the up-hole module is sliding along the outer surface of the pushrods you can continue to add rods above the module without having to deal with a tether cable. Once the push system has reached the lower limit, the operator can quickly un-clamp and raise the push head and up-hole module while maintaining full communication with the cone. This system will remove many of the obstacles prohibiting the automation of this process. See FIG. 4 for more detail.

This is not the first CPT wireless system in use today but it has one major advantage over the RF system which will not work when the rods fill with water and the acoustics system will not work well in certain soils and subsurface layers. If the material that is being pushed in contains a lot of rocks and stones, the scrapping along the rods will generate acoustic noise levels that will corrupt the communication signals. The major advantage of the magnetic system is that it is not susceptible to any of these problems. The magnetic system also offers a level of Electro Static Discharge (ESD) protection as the two modules are galvanically isolated.

DETAILED DESCRIPTION OF THE INVENTION

Wireless Magnetic Mutual Induction Communication is based on the principle of mutual induction and Faraday's Law. There are only three basic components to this invention. Two solenoids or coils of wire wound on a ferrous material such as an iron or steel spool and the pushrods themselves.

The first solenoid is the up-hole solenoid and is designed to fit freely but not loosely over the outer diameter of the pushrods. The solenoid needs to able to slide freely along the pushrods while maintaining good magnetic coupling which is critical for good communication performance. The solenoid's inner diameter will need to be matched to the particular size of the pushrods used. The solenoid is used to transmit signals into the pushrods by generating time varying flux lines. The solenoid is capable of receiving signals when it is not transmitting. The pushrods become a guide path for the flux lines which travel the entire length of the pushrod string. The entire pushrod string has become a very long electromagnet with a winding of wire on each end.

Figure 1:
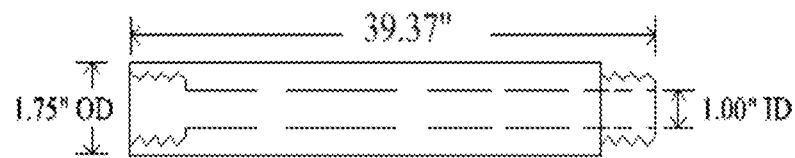
FIG. 1 This is a two dimensional horizontal view of a standard type pushrod. Pushrods are made from thick walled steel tubing. Pushrods can vary in size depending on the required usage. In general, the deeper you push the greater the pushrod's outer diameter needs to be. Most CPT systems use pushrods with a diameter of 1.75 or 1.44 inches and a standard length of one meter.
Figure 2:
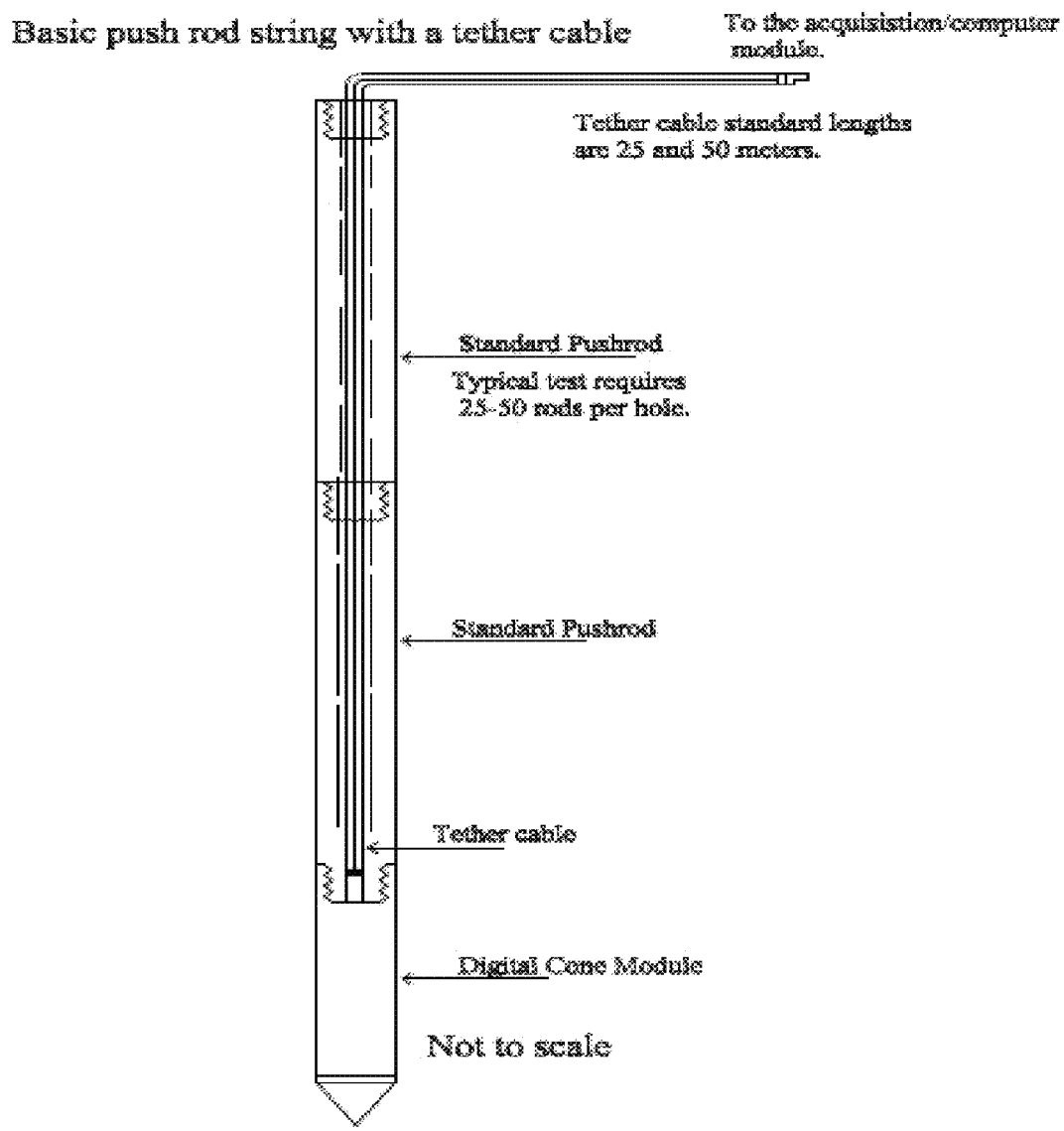
FIG. 2 This is a two dimensional vertical view of a typical tethered CPT system. The bottom or first section that enters into the ground is the digital cone module. The next or second section is the first pushrod as shown in FIG. 1). The top or third section is another pushrod. There could be many more pushrods added to the view but two is enough to get the concept across. Also notice the tether cable that must be threaded through each and every pushrod and connects to both the digital cone module and the acquisition/computer module on the top side.
Figure 3:
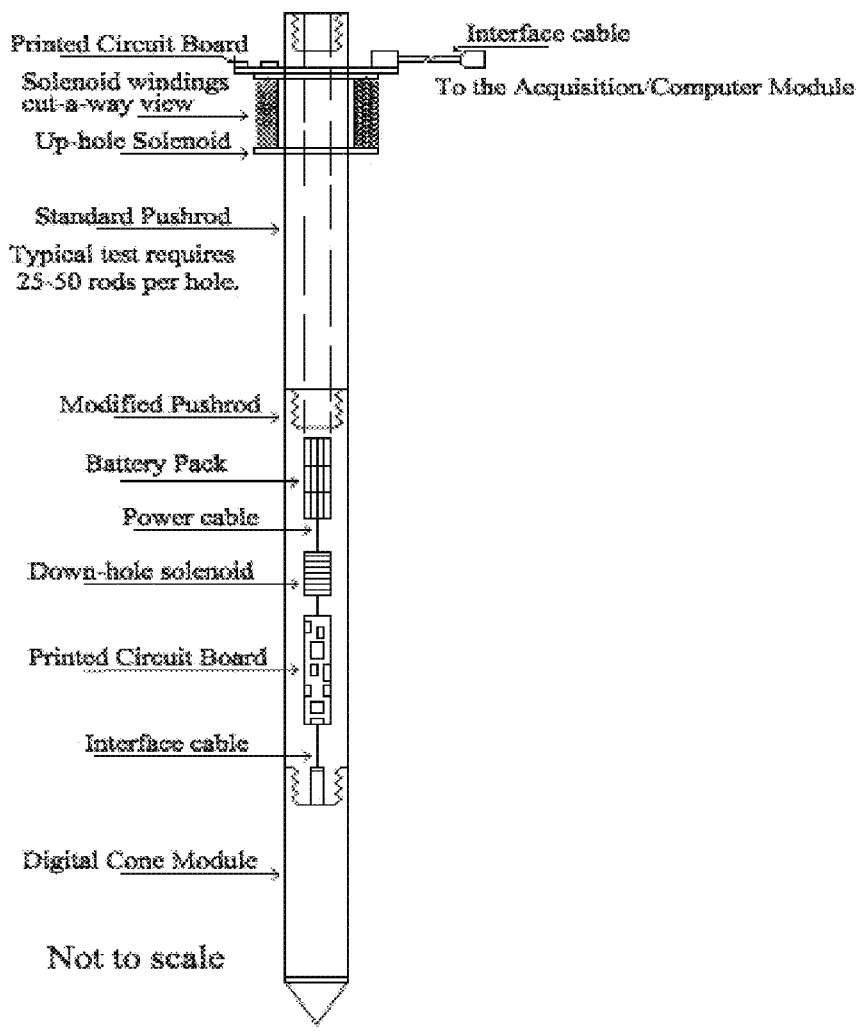
FIG. 3 This drawing is a two dimensional vertical view of a proposed wireless CPT system. The bottom or first section is the digital cone module and enters the ground first. The next or second section is the modified pushrod which now contains the down-hole Magnetic Mutual Induction electronic components. The components used are a PCB, a down-hole solenoid, inter-connection cabling and a battery pack. The top or third section is a standard pushrod without a tether cable be threaded through it. At the upper end the top pushrod is a cut-a-way view of the up-hole solenoid and PCB module. The cut-a-way view simply shows how the windings of the solenoid would look. On top of the solenoid is the PCB that performs all the required electronic functions as well as providing the cable interface to the acquisition/computer module. Notice how the solenoid is free to slide up or down on the pushrods as necessary.
Figure 4:
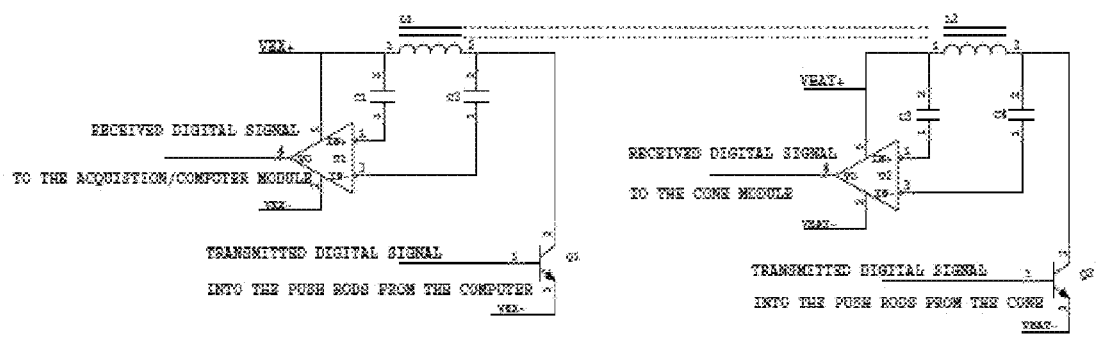
FIG. 4 This drawing is a simple electrical schematic that illustrates how the up-hole and down-hole modules can both transmit and receive data signals using the solenoids and utilizing the pushrods as the common telemetry path.

The second solenoid is the down-hole solenoid designed to fit inside a modified pushrod and used to transmit or receive signals. The solenoid is designed to fit smugly to the inner pushrod wall ensuring good magnetic coupling. This solenoid functions exactly like the up-hole version as far as sending and receiving signals. When the first solenoid generates a time varying set of flux lines the pushrods allow the flux lines to extend all the way to the second solenoid. The time varying flux lines then induce a voltage across the second solenoid winding. The voltage signal is proportional to the flux lines which are proportional to the time varying current signal that was applied to the first solenoid to generate the flux lines during transmit mode. The net effect is that the original digital signal transmitted from the up-hole module can be re-created in the down-hole module and that signal can be passed on to the cone module. The whole process can start at the cone module and be transmitted to the up-hole module in the same exact manner. See FIG. 4 for more detail.

The third component is the set of pushrods. The pushrods are integral to the entire system. Without the pushrods, the flux lines would not be able to extend far enough to be of practical use. The pushrods are made of a quality steel with a relative permeance that could range between three hundred and three thousand as compared to air that has a relative permeance of one. Permeance is defined as a measure of the ability of a magnetic circuit to permit the setting up of magnetic flux lines. Permeance can be thought of as the counterpart of conductance in an electrical circuit.

The purpose of this system is to act as a digital signal repeater. This system was designed to replace an existing tether cable. The user can simply remove their tether cable from the cone module and add the modified pushrod containing the down-hole module. On the top side, the user would simply slide the up-hole module over the pushrods above the head clamping system and connect an interface cable between their acquisition/computer system and the up-hole module. The goal is to allow the user to have both telemetries at their disposal without having to purchase any new equipment other than this system.

Both the up-hole and down-hole modules have a microcontroller based PCB that is designed to receive a digital signal then drive the solenoids at a carrier frequency of 125 KHz using On-Off Keying (OOK) as the data modulation format. When a bit is received from the computer or the cone, the solenoids will be driven into oscillation as long as the bit is high. Choosing a 125 KHz carrier frequency will allow data baud rates in the range of, but not limited to 9600 and 19200 bits per second to be used with this system. When the modules are not in transmit mode they default to listen mode. The solenoids will produce a voltage when time varying flux lines are present. The PCB circuitry will convert the 125 KHz "OOK" voltage signals back into digital bits. The bits will be placed back on both a RS-232 bus and a RS-485 bus and sent to the computer or cone. This system is designed to use a half-duplex protocol. In a half-duplex protocol one module must be in listen mode while the other is in transmit mode. All modules must default to listen mode when not transmitting. Only one module can transmit at a time but all other modules can listen.

The invention claimed is:

1. A magnetic, cone penetrometer communication system, comprising:
    a transmitter coupled to a first solenoid for transmitting data wherein the first solenoid induces a modulated magnetic field into a first pushrod section of the cone penetrator, wherein adjacent connected pushrod sections form a communication channel for the magnetic field;
    a second solenoid located on a second pushrod section of the cone penetrator and spaced, at least one section apart, from the first solenoid wherein the modulated magnetic field induces a voltage into the second solenoid; and a receiver coupled to the second solenoid to recover the data from the voltage.

2. The magnetic, cone penetrometer communications system in claim 1, wherein at least one of the solenoids is slidably coupled to its respective pushrod.

3. The magnetic, cone penetrometer communication system in claim 1, wherein in at least one of the solenoids is embedded within the inner wall of its respective pushrod.

4. The magnetic, cone penetrometer communication system in claim 2, wherein one of the solenoid is on the outer surface of its respective pushrod and the other solenoid is on the inner surface of its respective solenoid.

* * * * *